United States Patent [19]

Colombo

[11] 4,456,660
[45] Jun. 26, 1984

[54] COEXTRUDED TWO-PLY LAMINATE FILMS OF LOW DENSITY POLYETHYLENE AND BLEND OF POLYBUTENE-1 AND POLYETHYLENE OR POLYPROPYLENE

[75] Inventor: Edward A. Colombo, Fairport, N.Y.

[73] Assignee: Mobil Oil Corporation, New York, N.Y.

[21] Appl. No.: 175,784

[22] Filed: Aug. 6, 1980

Related U.S. Application Data

[63] Continuation of Ser. No. 969,038, Dec. 13, 1978, abandoned.

[51] Int. Cl.³ .................. B32B 1/02; B32B 27/08; B65D 29/06
[52] U.S. Cl. .................. 428/516; 428/517; 428/519; 428/521; 428/35; 264/176 R
[58] Field of Search ............. 428/516, 517, 519, 521

[56] References Cited

U.S. PATENT DOCUMENTS

| | | | |
|---|---|---|---|
| 3,508,944 | 4/1970 | Henderson et al. | 428/516 X |
| 3,754,063 | 8/1973 | Schirmer | 428/36 |
| 3,900,635 | 8/1975 | Funderburk et al. | 428/516 |
| 4,147,291 | 4/1979 | Akao | 428/516 |
| 4,169,910 | 10/1979 | Graboski | 428/516 X |

Primary Examiner—Patricia C. Ives
Attorney, Agent, or Firm—Alexander J. McKillop; Michael G. Gilman; Edward J. Trojnar

[57] ABSTRACT

There are provided coextruded two-ply laminate films in which one of the lamina is low density polyethylene and the other is a blend of 10–50 weight percent polybutene with 90–50 weight percent polypropylene or low density polyethylene. Such laminated films are tough and have good tear resistant.

2 Claims, 1 Drawing Figure

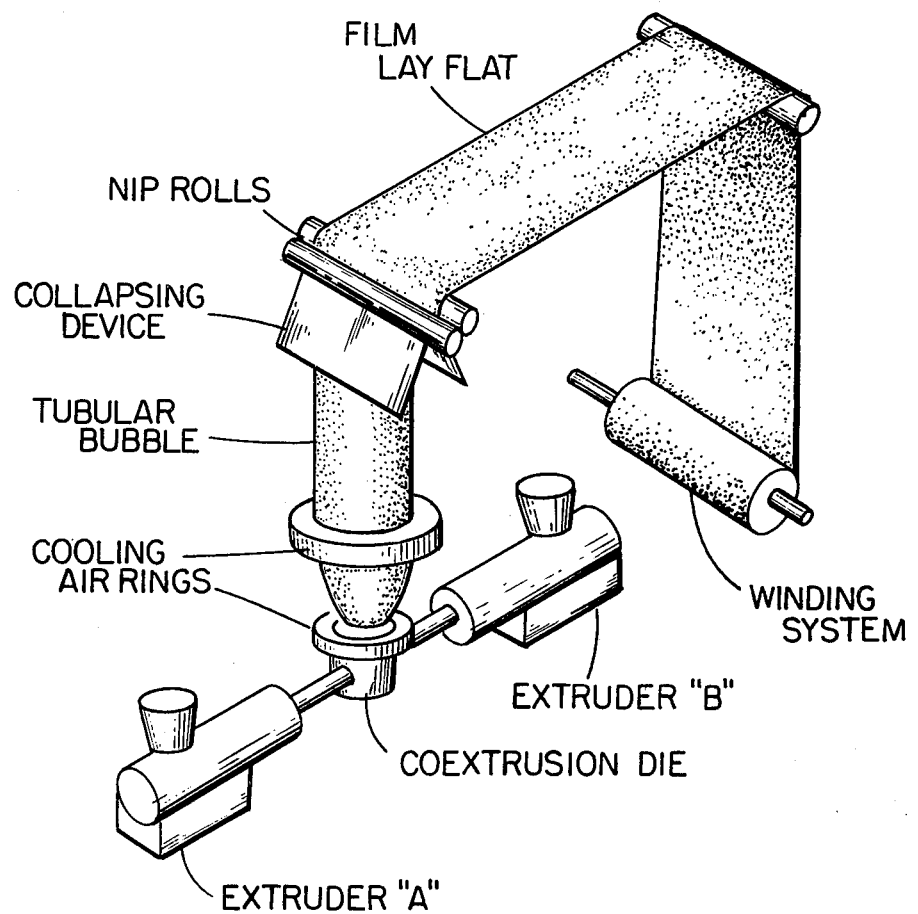

COEXTRUDED TWO-PLY LAMINATE FILMS OF LOW DENSITY POLYETHYLENE AND BLEND OF POLYBUTENE-1 AND POLYETHYLENE OR POLYPROPYLENE

CROSS-REFERENCE TO RELATED APPLICATIONS

This application is a continuation of U.S. patent application Ser. No. 969,038, filed Dec. 13, 1978, and now abandoned.

BACKGROUND OF THE INVENTION

1. Field of the Invention

This invention is concerned with film laminates of low density polyethylene and polyolefin blends.

2. Description of the Prior Art

It has been proposed to coextrude laminated films from two or more different thermoplastic polymers. Insofar as is now known, it has not been proposed to coextrude laminated films of the low density polyethylene and blends of polybutene-1 and low density polyethylene or polypropylene.

SUMMARY OF THE INVENTION

This invention provides a coextruded laminated film in which one of the lamina is a film of low density polyethylene and the other is a film of a blend of between about 10 percent and about 50 percent, by weight, polypropylene and between about 90 percent and about 50 percent, by weight, polybutene-1 or of a blend of between about 10 percent and about 50 percent, by weight, polybutene-1 and between about 90 percent and about 50 percent, by weight, low density polyethylene.

DESCRIPTION OF THE DRAWINGS

FIG. 1 presents a diagrammatic representation of a typical apparatus for forming the coextruded two-ply laminate films of this invention.

DESCRIPTIION OF SPECIFIC EMBODIMENT

The polyethylene used in the films of this invention is low density polyethylene (LDPE) having a density of about 0.910–0.925 g. per cc. LDPE is prepared by the high pressure process and is commercially available. Preferably, the LDPE will have a melt index of between about 0.2 and about 6 (ASTM D 1238-73, condition E).

The polypropylene utilizable herein is highly isotactic polypropylene (PP) having an Isotactic Index (II) greater than 90 and a density of about 0.902–0.910 g. per cc. Preferably, it will have a melt flow of between about 1 and about 10 (ASTM condition L). PP is readily available commercially.

Polybutene-1 (PB-1) should be of film-forming molecular weight. PB-1 has a density of about 0.908–0.917. Preferably, it will have a melt index of between about 15 and about 2.5 (ASTM condition E). PB-1 is commercially available or it can be prepared as described in U.S. Pat. No. 3,362,940.

The blends of PB-1/PP and PB-1/LDPE can be made by mixing in any blending equipment, such as a Banbury mixer. A preferred method, however, is by extruder blending. Pellets or granules of the blend components are mixed in a drum tumbler, ribbon blender, or other suitable mixing apparatus and fed into the hopper of the extruder from which the film is extruded.

The blends of PB-1 and PP contain between about 10 percent and about 50 percent, by weight, polypropylene and between about 90 percent and about 50 percent, by weight, polybutene-1. The blends PB-1 and LDPE contain between about 10 percent and about 50 percent, by weight, polybutene-1 and between about 90 percent and about 50 percent, by weight, low density polyethylene.

The laminates of this invention can be made using any suitable coextrusion technique. Preferably, the laminate is formed as a tube, although it can be formed as a flat film laminate. The gauge of each lamina can be the same or they can have dissimilar gauges. The film gauge will ordinarily be between about 0.5 mil and about 4 mils. Suitable coextrusion techniques are described in U.S. Pat. Nos. 3,480,998; 3,337,914; and 3,223,761. It should be understood, however, that the particular method or technique used to form the laminates according to this invention are not a critical factor of the invention.

Blending can be effected in various ways known in the art, such as Banbury mixing. A suitable and preferred method is blending in an extruder. The components of the blend can be mixed in a drum tumbler, ribbon blender, or other suitable dry mixing apparatus and fed in the hopper of the extruder. Alternatively, the components can be fed directly to the hopper in separate metered streams.

As diagrammed in FIG. 1, LDPE is extruded as a tube from Extruder "A" into a coextrusion die. A polymer blend is extruded as a tube from Extruder "B" into the coextrusion die to surround the LDPE tube. The two tubes emerge from the coextrusion die from a common annular orifice as a common tube. Using conventional techniques, this film is cooled by air rings and inflated as a bubble drawn by nip rolls, collapsed, and collected on a take-up roll in the winding system.

In the following illustrative examples, parts are by weight.

EXAMPLE 1

A series of dry blends were prepared by mixing pellets of polypropylene and of polybutene-1 in various proportions, as set forth in Table I. Each blend also contained 6 weight percent green masterbatch, based on the total weight of the PP/PB-1 blend. Blending was effected in a drum tumbler. In a series of runs, a dry blend was fed to the hopper of one extruder of a coextrusion apparatus similar to that described in FIG. 1 and low density polyethylene containing 8 weight percent white masterbatch was fed to the hopper of the other extruder. A two-ply tubular laminate was coextruded having the blend film as the outer film layer, each film or ply being 0.75 mil thick.

In this example, the polybutene-1 had a density of 0.91 g./cc. and a melt index of 2.0 g./10 min. The low density polyethylene had a density of 0.921 g./cc. and a melt index of 2 g./10 min. The green masterbatch used for pigmentation contained Carbon Black Sterling "R" 18%-Iron Blue-10%-Chrome Yellow-10%-Ca Stearate 1%-LDPE 61% and the white masterbatch contained 50% Titanium Dioxide+8% Calcium Carbonate+42% LDPE.

Each laminated film was subjected to tensile testing (ASTM D-882-756), to toughness (index) determination (area under stress strain curve), to the Elmendorf tear test (ASTM D-1922-67) and to gloss testing (ASTM D-2457-70).

Pertinent data are set forth in Table I.

TABLE 1

| Outer Layer, Parts | | Inner Layer, Parts | Ten. Modulus psi × 10⁴ | | Yield Str. psi × 10³ | | Break Str. psi × 10³ | | Break Elong. % | | Toughness Ft. lbs/in³ | | Elm. Tear Gms/mil | | Gloss % | |
|---|---|---|---|---|---|---|---|---|---|---|---|---|---|---|---|---|
| PP | PB-1 | LDPE | MD | TD | MD | TD | MD | TD | MD | TD | MD | TD | MD | TD | MD | TD |
| 100 | 0 | 100 | 12.71 | 12.09 | 3.38 | 2.82 | 3.54 | 2.37 | 424 | 115 | 1052 | 207 | 13 | 77 | 29.9 | 28 |
| 50 | 50 | 100 | 5.59 | 5.87 | 2.32 | 2.16 | 3.43 | 2.96 | 443 | 535 | 905 | 909 | 143 | 249 | 24.9 | 23 |
| 20 | 80 | 100 | 3.73 | 3.74 | 1.80 | 1.75 | 3.63 | 3.19 | 382 | 458 | 773 | 779 | 189 | 399 | 27.3 | 27 |
| 10 | 90 | 100 | 3.22 | 3.48 | 1.81 | 1.67 | 3.97 | 3.07 | 358 | 410 | 800 | 680 | 374 | 536 | 25.9 | 26 |
| 0 | 100 | 100 | 2.67 | 2.99 | 1.87 | 1.84 | 3.93 | 3.16 | 283 | 370 | 667 | 675 | 370 | 379 | 18.9 | 16 |

From the data in Table I, it will be noted that improved tear resistance and toughness are attained using the laminates of PP/PB-1 and LDPE. In practice, it does not matter which resin is used to form the outer layer, i.e., the outer layer can be LDPE with the blend as the inner layer.

EXAMPLE 2

As described in Example 1, a series of dry blends of low density polyethylene and polybutene-1, in the proportions set forth in Table II, were prepared. Each blend contained 8 weight percent green masterbatch based on the total weight of the LDPE/PB-1 blend. In a series of runs as described in Example 1, a two-ply tubular laminate was coextruded having the blend film as the outer layer and LDPE containing 6 weight percent white masterbatch as the inner layer. Each ply or film being 0.75 mil thick.

The resins and masterbatches used were those described in Example 1. Each laminated film was subjected to testing, as defined in Example 1. Pertinent data are set forth in Table II.

The improved properties of the two-ply laminated films of this invention render them suitable for a variety of packaging uses. Because of their toughness and tear resistance, these films are particularly suitable for forming trash can liners and heavy duty sacks and bags.

Although the films demonstrated in the examples were pigmented, the laminates can be prepared from clear films. The polyolefins can contain other additives commonly used with polyolefins, such as dyes, antioxidants, anti-static agents, and anti-blocking agents.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

I claim:

1. A coextruded two-layer laminated film in which one of the lamina is low density polyethylene and the other lamina comprises a blend of between about 10 and about 50 weight percent of polybutene-1 and between about 90 and about 50 weight percent of low density polyethylene.

2. The laminated film of claim 1 in which said blend contains about 50 weight percent low density polyethylene and 50 weight percent polybutene-1.

TABLE II

| Outer Layer, Parts | | Inner Layer, Parts | Ten. Modulus psi × 10⁴ | | Yield Str. psi × 10³ | | Break Str. psi × 10³ | | Break Elong. % | | Toughness Ft. Lbs/in³ | | Elm Tear Gms/mil | | Gloss & | |
|---|---|---|---|---|---|---|---|---|---|---|---|---|---|---|---|---|
| LDPE | PB-1 | LDPE | MD | TD | MD | TD | MD | TD | MD | TD | MD | TD | MD | TD | MD | TD |
| 100 | 0 | 100 | 2.08 | 2.40 | 1.34 | 1.36 | 2.01 | 1.94 | 320 | 420 | 449 | 514 | 62 | 107 | 31.4 | 33 |
| 95 | 5 | 100 | 2.04 | 2.34 | 1.31 | 1.34 | 2.19 | 2.17 | 362 | 471 | 524 | 600 | 71 | 116 | 32.7 | 32 |
| 90 | 10 | 100 | 2.12 | 2.45 | 1.34 | 1.39 | 2.36 | 2.21 | 378 | 484 | 570 | 633 | 109 | 142 | 32.1 | 29 |
| 80 | 20 | 100 | 2.17 | 2.11 | 1.38 | 1.36 | 2.54 | 2.25 | 356 | 468 | 580 | 615 | 162 | 162 | 28.5 | 24 |
| 50 | 50 | 100 | 2.12 | 2.47 | 1.40 | 1.47 | 2.90 | 2.44 | 355 | 381 | 619 | 565 | 228 | 255 | 27.2 | 21 |

As was the case in Example 1, it will be noted from the data in Table II that improved tear resistance and toughness are attached using the laminates of LDPE/PB-1 and LDPE. Again, it does not matter which resin forms the outer layer.